Aug. 14, 1934.  K. MAYBACH  1,970,385

LUBRICATING SYSTEM FOR TRANSMISSION GEARS

Filed April 23, 1929

Inventor:
Karl Maybach

Patented Aug. 14, 1934

1,970,385

UNITED STATES PATENT OFFICE 1,970,385

LUBRICATING SYSTEM FOR TRANSMISSION GEARS

Karl Maybach, Friedrichshafen, Germany, assignor to Maybach-Motorenbau Gesellschaft mit beschrankter Haftung, Friedrichshafen, Germany Application April 23, 1929, Serial No. 357,457
In Germany September 22, 1928

5 Claims. (Cl. 184—11)

My invention relates to change speed gears and has special reference to over-speed gears as described in my co-pending application Ser. No. 266,292 now Reissue Patent No. 17,707. But of course it can be applied in many similar cases, where the conditions for its use are given.

The invention will be understood best by having reference to the drawing which represents an example embodying my invention. A transmission gear is shown therein which is of the type disclosed in my above mentioned copending application.

Figure 1:
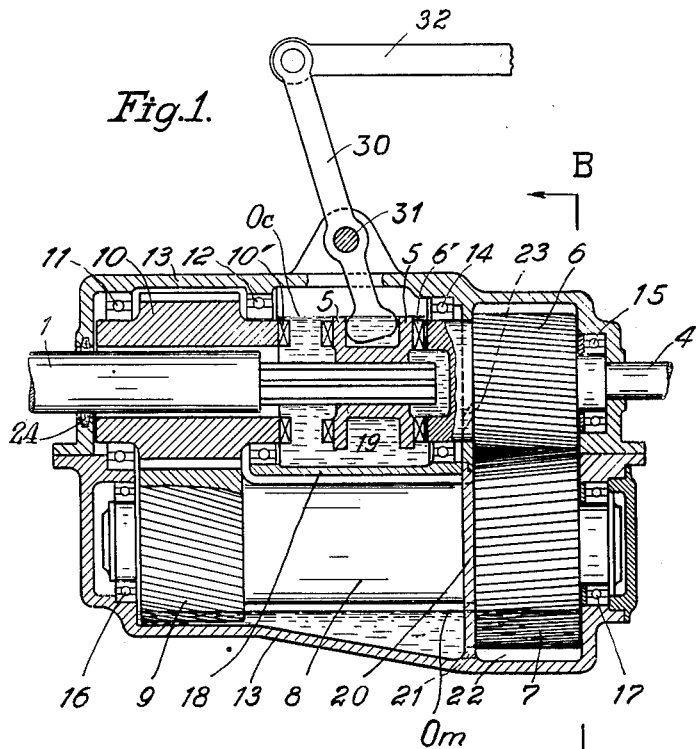
Fig. 1 is a longitudinal vertical section through the gear casing showing the gears in view and partly in section.
Figure 2:
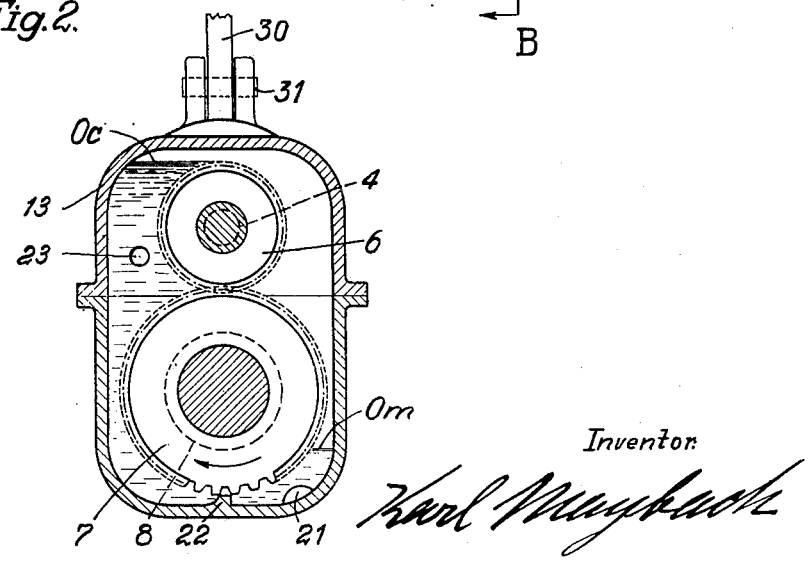
Fig. 2 is a transverse cross section taken on line B—B of Fig. 1, seen in the direction of the arrows.

On the driving shaft 1 a spur wheel 10 is loosely mounted whereas sleeve 5 is splined thereto. Driven shaft 4 is provided with a spur wheel 6 which is rigidly fixed to it. Two spur wheels 9 and 7 are rigidly fixed to the stub shaft 8. These latter two wheels are in constant mesh with wheels 10 and 6, respectively.

Wheel 10 is journaled in bearings 11 and 12; whereas bearings 14 and 15 serve for journaling wheel 6. Stub shaft 8 is supported in bearings 16 and 17.

Sleeve 5 at each of its two ends is provided with claws which alternately come into contact and engage with corresponding claws 10' and 6' at the side faces of wheels 10 and 6, respectively. Lever 30 journaled at 31 by means of rod 32 serves for shifting sleeve 5 into the right hand position, as represented, or into its corresponding left hand position, not shown.

The entire transmission is surrounded by a casing 13, made of two parts.

When shifting sleeve 5 from one position into its other position the claws which come into contact are revolving with different speeds. Eventually their speeds will become equal, but until this moment has come the front faces of the claws which are in contact are sliding on each other. This sliding ought to be smoothed out in every possible way. Therefore grease or oil may be put between the surfaces of the claws.

This is of special importance with the transmission according to my above mentioned copending application, in which the front faces of the claws are so beveled or pitched that the coupling halves are prevented from final engagement until the originally slower half begins to overrun the originally faster half. Thus the two halves are held in contact by manual force or by means of a spring for a certain time period with the front faces of their claws rattling past one another. Here it is best to have the claws running constantly in an oil bath so that the bumping effect will be smoothed out and also made practically noiseless by the oil film which always remains between the sliding front faces.

According to the present invention I improve these conditions by providing a special compartment for the shiftable member 5 with its two claw couplings within the general casing for the transmission, and into this compartment oil is pumped constantly so that it is always filled therewith. Thus it is not necessary to have the main casing filled with oil to its top, which means a saving in oil and weight and also an increase in reliability; for it might happen while the speed gear is running, that the oil level in the casing sinks below the claw couplings. This is prevented by my special compartment 19 and its surrounding wall 18. Still some oil will escape by the bearings 12 and 14 and other possible leakage. This is compensated for by a constantly working oil pump which always presses oil into the compartment 19, for example through the aperture 23. In the drawing, a substantial clearance is shown between the cog wheel 10 and the shaft 1. This is done to make it clear that these two are separately rotatable, and it is obvious that in practice no great clearance will be needed between these two, so that there will be no substantial leakage of oil between them other than can be taken care of by the constantly working oil pump which I have referred to. However, if desired, a packing of usual type may be provided at the place where shaft 1 passes through the main casing as indicated by the numeral 24.

Instead of providing a special pump for this purpose I prefer to make use of one pair of the cog wheels of the transmission therefor. In the example represented wall 20 separates wheels 6 and 7 which are constantly meshing from the main portion of the inner space of casing 13 and forms a portion of the wall 18 of compartment 19; but still a connecting hole 21 is left between both portions, that is between the portion of the main compartment in which wheels 6 and 7 are located and the main portion of the inner space. Furthermore the lower surrounding casing 13 is provided with a special inward extension 22 in the compartment in which wheels 6 and 7 are located. This extension is so shaped that its upper edge nearly reaches the top of the teeth of wheel 7.

Thus cog wheel 7 acts as a kind of oil pump because every tooth passing by extension 22 takes a certain amount of oil from the right hand side of the compartment which is in connection with the main portion of the casing and presses it into the left hand side thereof which is in connection with the first special compartment 19. The main oil level need not be higher than indicated at Om, still the level in compartment 19 will be as indicated at Oc. This latter level is dependent from the ridge of wheel 6 over which the oil will over-flow in case the amount pumped by wheel 7 be more than wanted.

Of course, alterations in the construction may be provided without deviating from the spirit of my invention. Therefore I do not want to be limited to the details described or shown in the drawing, as many variations will occur to those skilled in the art.

What I claim is:

1. A transmission gear comprising a driving and a driven shaft, transmitting cog wheels and a shiftable rotatable member with claw couplings for alternately setting one or the other speed, claw couplings upon said transmitting cogs, a casing surrounding said transmission gear partially filled with oil, and partition members forming a separate compartment within said casing enclosing said shiftable rotatable member and said claw couplings, and means for maintaining a level of oil in said compartment above the oil level in the casing and high enough so that said couplings are substantially submerged therein.

2. In a two-speed gear comprising a driving shaft, a driven shaft, a number of cog wheels adapted to transmit in two different speeds, power and rotation from one shaft to the other shaft and a shiftable member with claw couplings for alternately setting one or the other speed; a main casing surrounding said entire speed gear filled with oil to a certain level, walls in said casing forming a separate compartment therein above the normal oil level in the casing and enclosing said shiftable member, walls in said casing forming another separate compartment therein and enclosing a meshing pair of said cog wheels; said two compartments being connected with each other and said second compartment being connected near its bottom to the inner space of the main casing, and means adapted to cooperate with the lowermost cog wheel of said pair, to cause said wheel to act as an oil pump to force oil upwardly from its level in the main casing, and means for conducting such oil into said first-mentioned separate compartment.

3. A transmission gear comprising a driving and a driven shaft, transmitting cog wheels and a shiftable, rotatable member with claw couplings for alternately setting one or the other speed, said transmission gear being surrounded by a main casing filled with oil to a certain level, a separate compartment within said main casing surrounding said shiftable, rotatable member above the oil level in said main casing, means for causing one of said transmitting cog wheels to act as a positive oil pump to pump oil upward from the level in the main casing, and means for conducting such oil into said separate compartment.

4. A transmission gear comprising a driving and a driven shaft, transmitting cog wheels and a shiftable rotatable member with claw couplings for alternately setting one or the other speed, said transmission gear being surrounded by a main casing filled with oil to a certain level, said shiftable, rotatable member being enclosed in a separate compartment within said main casing, means for pumping oil from the lower part of said main casing into said compartment, and means for maintaining a level of oil in said compartment above the oil level in the main casing and high enough so that said couplings are substantially submerged therein.

5. In combination with a transmission comprising a driving and a driven shaft, a cog wheel loosely surrounding said driving shaft, a second cog wheel which is fixed to said driven shaft, a third cog wheel below and in mesh with said second cog wheel, a shiftable member on said driving shaft between said first two cog wheels, means for alternately connecting said member either with said cog wheel surrounding said driving shaft or with said driven shaft, a main casing for said transmission, a separate compartment for said shiftable member, a partition separating said second and third cog wheels from the bottom of the main casing and substantially confining them, such partition having an opening near its bottom extending into the chamber of the main casing and having a second opening higher up extending into the compartment for said shiftable member, a projection on the floor of the main casing below the lower of said cog wheels positioned to give limited clearance from the teeth thereof and extending across the width thereof, whereby such gear will serve as a pump to force oil up to said compartment.

KARL MAYBACH.